United States Patent [19]

Lazenby et al.

[11] 3,737,768

[45] June 5, 1973

[54] APPARATUS FOR THE REMOTE DETECTION OF CONDUCTING BODIES UTILIZING ELECTROMAGNETIC WAVEFORMS EXHIBITING ABRUPT DISCONTINUITIES

[75] Inventors: Peter G. Lazenby, Streetsville, Ontario; Hendrik M. Wondergem, Weston, Ontario, both of Canada

[73] Assignee: Selco Mining Corporation Limited, Toronto, Ontario, Canada

[22] Filed: Feb. 22, 1971

[21] Appl. No.: 117,444

[52] U.S. Cl.............................................324/3, 324/6
[51] Int. Cl. ...........................G01v 3/10, G01v 3/16
[58] Field of Search.......................324/6, 3, 4, 77 A; 328/153, 151

[56] References Cited

UNITED STATES PATENTS

| 3,256,492 | 6/1966 | Gilchrist | 324/66 UX |
| R25,908 | 11/1965 | Barringer | 324/6 X |
| 3,278,846 | 10/1966 | Patten et al. | 324/77 A |

*Primary Examiner*—Gerard R. Strecker
*Attorney*—Maybee & Legris

[57] ABSTRACT

In an apparatus for the remote detection of ore bodies, comprising means for radiating a primary electromagnetic waveform exhibiting abrupt discontinuities, means for discerning secondary signals induced in and reradiated from a conducting body together with transient components of such secondary signals, and means for sampling and examining the transient components, the transient components are processed serially and applied to a signal averager providing a number of channels the outputs from which correspond to the respective time average values of sequential portions of the transient wave form.

5 Claims, 4 Drawing Figures

INVENTORS
PETER G. LAZENBY
HENDRIK M. WONDERGEM
BY
*Maybee & Legris*
ATTORNEYS

APPARATUS FOR THE REMOTE DETECTION OF CONDUCTING BODIES UTILIZING ELECTROMAGNETIC WAVEFORMS EXHIBITING ABRUPT DISCONTINUITIES

This invention relates to apparatus for the remote detection of conduction bodies, such as ore bodies.

The invention is concerned particularly with apparatus of the general kind in which a primary electromagnetic waveform exhibiting abrupt discontinuities at intervals is generated so as to induce in a remote conducting body secondary signals, which are reradiated together with any transient components thereof by the conducting body, the apparatus further including a receiver for discerning the reradiated signals, and means for sampling and analyzing the transient components of such signals to derive information relating to the conducting body.

An apparatus of this general kind is described in detail in U.S. Pat. No. Re. 25908, dated Nov. 16, 1965, and assigned to Selco Explorations Company Limited. The said prior apparatus basically comprises: transmitting means for generating a primary electromagnetic waveform exhibiting abrupt discontinuities at a predetermined frequency; inductive receiving means for discerning secondary signals induced by the primary waveform and reradiated by a conducting body together with any transient components of the secondary signals occurring after the abrupt discontinuities in the primary waveform; amplification means for amplifying the discerned signals; adjustable means filtering the discerned signals; adjustable detection means normally blocking the signals and operable intermittently to sample portions of the discerned secondary transient components following the discontinuities in the primary electromagnetic waveform; tuned amplifier means amplifying the sampled portions of the discerned signals, the amplifier means being tuned to the frequency of the abrupt discontinuities in the primary waveform; second adjustable detector means for sampling portions of the amplified signal from the tuned amplifier means; means for integrating the last-mentioned sampled portions; and recording means for recording the integrated signals, thereby to provide graphic evidence of the presence of conducting bodies.

A particular advantage of apparatus of the kind referred to, in which transient responses are used, is that it permits the secondary field of a conductor to be measured during a period when the primary field is either absent or not varying with time, regardless of the orientation of the receiving coil; thus secondary fields can be measured without any noise levels due to interference of the primary field regardless of variations in the coupling between the transmitting and receiving coils. Another important advantage of the apparatus is that it permits the use of three mutually perpendicular receiving coils for the measurement of all three components of the secondary field.

While the above-mentioned apparatus represents a considerable improvement upon previously known apparatus for the detection of ore bodies, it cannot generally be used to distinguish between ore bodies of different widths, where those widths are small, whereby to estimate their respective conductivity widths. The reason for this is inherent in the method by which the low level information signals are extracted from noise using tuned amplifiers and sampling gates in a parallel, multi-channel arrangement. The complete secondary signal discerned by the receiver is passed through sequentially timed sampling gates, the sampled signal portions being amplified and processed in independent parallel channels consisting of tuned amplifiers, timing gates and integrating circuits. The inherent drift characteristics of the tuned amplifiers and associated electronic circuitry necessitate the use of sampled pulses of appreciable width and also the use of low pass filters of long time constant as the integrating circuits, and since the time constant of the low pass filter of a channel is, generally speaking, longer than the time constant of the response of the secondary field in the case of most ore bodies under investigation, such bodies appear to have the same width. In other words, the time constant of the integrating circuit sets a limit on the resolving power of the apparatus with respect to widths of ore bodies.

According to the present invention the above limitations are overcome by providing an apparatus of the kind referred to, but in which the sampled secondary signal portions are processed serially and amplified by common circuit, so that the effects of drift, instability and any noise are the same for all channels; integration is performed not by low pass filters, but by a signal averager.

An apparatus according to the present invention comprises:

a pulse generator for generating a sequence of pulses;

transmitter means for radiating a primary electromagnetic waveform exhibiting abrupt discontinuities at times determined by said sequency of pulses;

inductive receiving means for discerning secondary signals induced by said primary waveforms and reradiated by a conducting body together with any transient components of said secondary signals occurring after said abrupt discontinuities in the primary waveform;

amplification means for amplifying the discerned signals;

electronic gating means operable intermittently to sample said secondary transient components following said abrupt discontinuities in the primary waveform;

means responsive to said sequence of pulses for intermittently operating said gating means for gating said secondary transient components whereby to derive a repetitive waveform characteristic of a sequence of said secondary transient components;

further amplification means connected to said gating means for amplifying said repetitive waveform;

a signal averager connected to receive the repetitive waveform, the signal averager providing a plurality of channels with outputs representing the average values of sequential portions of the repetitive waveform; and recording means connected to said channels for recording said outputs.

By an "analogue signal averager" is meant an instrument having an input to receive a repetitive waveform, scanning means operating in synchronism with the repetitive waveform for scanning in sequence successive portions of the waveform, and an analogue memory having a number of memory locations corresponding to the number of such portions for storing and averaging the same, and a number of output facilities to which the memory locations are connected individually or in groups. A suitable instrument for the purpose described herein is the signal averager sold by Princeton Applied Research Corporation as Model TDH-9, under the trade mark "Waveform Eductor." The Model TDH-9 signal averager has an analogue memory comprising capacitors controlled by field effect transistors, making possible the use of high input impedance buffer amplifiers for connecting the memory elements into a selected number of output channels.

In order that the invention may be readily understood, preferred embodiments thereof, as applied to aerial survey apparatus, will now be described by way of example with reference to the accompanying drawings, in which.

The structure of the apparatus, other than the particular electronic circuitry for processing the secondary signals discerned by the receiving means, is as described in the aforementioned U.S. Pat. No. Re. 25908, the contents of which are incorporated herein by reference. The apparatus includes three mutually perpendicular inductive receiving coils for detecting the three components of a secondary field, each coil being associated with its respective receiving system; only one such coil and receiving system are illustrated in the accompanying drawings, the others being essentially similar in their arrangement and operation. For simplicity and to avoid undue repetition, the apparatus will therefore be described with respect to one such coil and receiving system only.

Figure 1:
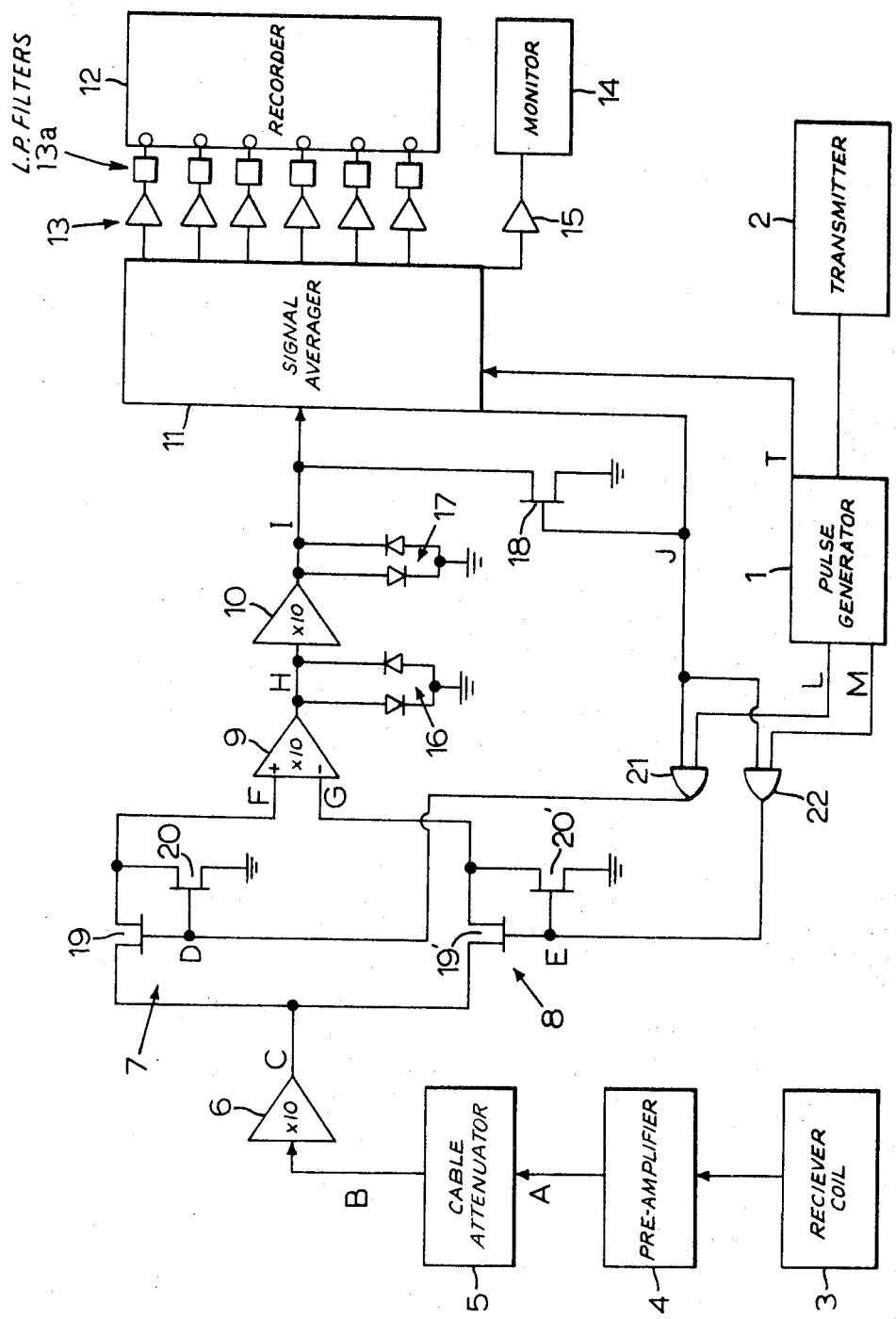
FIG. 1 is a block diagram of one receiving system of the invention.
Figure 2:
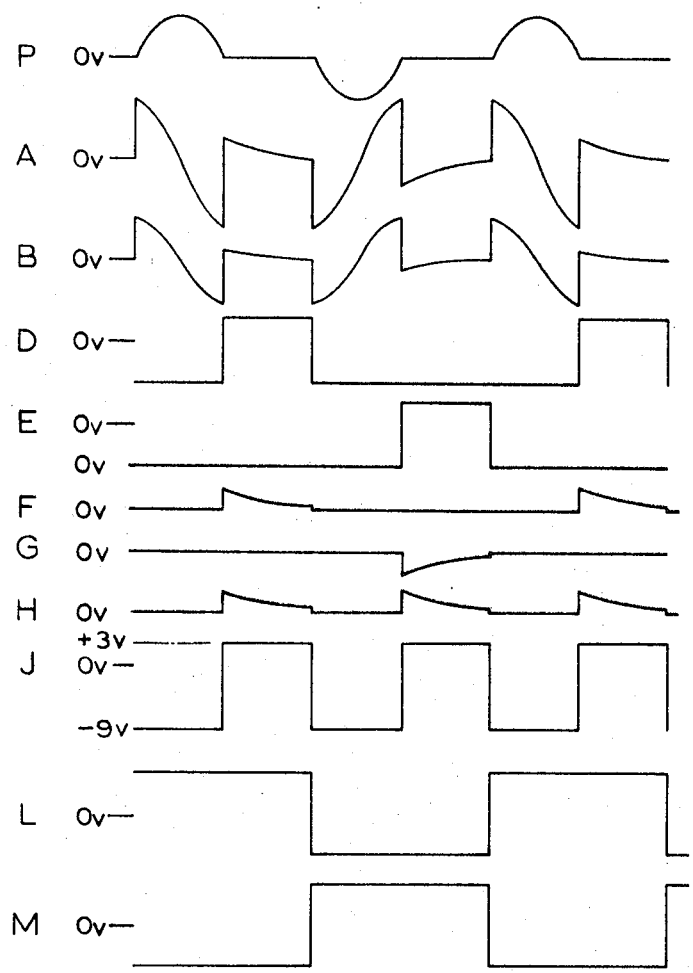
FIG. 2 is a timing diagram illustrating the processing of signals in the receiving system.

Referring to FIG. 1, a pulse generator 1 for generating a sequence of pulses is coupled to a transmitter 2 which radiates a primary electromagnetic field having a waveform which exhibits abrupt discontinuities at times determined by the sequence of pulses (see FIG. 2). The recurrence frequency of the pulses, while typically being of the order of 280 pulses per second, is not critical, for reasons that will later become apparent. The primary electromagnetic field, if radiated towards a conducting body such as a massive sulphide ore deposit, induces a secondary current in the conducting body which reradiates secondary signals together with any transient components of such signals. The secondary signals and transient components are received by a ferrite cored receiving coil 3, the received signal being amplified by a low noise preamplifier 4. The amplified secondary signal A typically may have a peak to peak amplitude of 2 volts. The amplified signal is then fed through an A.C.-coupled attenuator 5, the signal from which typically has a peak to peak amplitude of 200 mV.

The system as so far described with respect to the transmission of the primary electromagnetic field and the reception and preamplification of the secondary signals, is essentially the same as that of U.S. Pat. No. Re. 25908, but the remaining parts of the system whose operation will now be described are fundamentally different.

The output signal B from the cable attenuator 5 is again amplified by an amplifier 6 to minimize the effect of pedestals in the subsequent circuitry which employs field effect transistors. The signal B is of alternating polarity and representing the complete secondary signals with transient components (see FIG. 2), and the subsequent circuitry is designed to rectify and isolate the transient components thereby to derive a repetitive waveform (as shown by H in FIG. 2) characteristic of a sequence of the secondary transient components. The output signal C is applied to two parallel gating circuits 7, 8, which are triggered alternately by applied pulses D and E for gating waveforms F and G of opposite polarities, the latter waveforms being applied respectively to the opposite polarity input terminals of a differential amplifier 9, whose output H is the desired repetitive waveform of one polarity representing a sequence of secondary transient components. The output signal H is further amplified by an amplifier 10, the amplified signal I being applied to the input of a signal averager 11 which is connected to provide a plurality of channels with outputs representing the time average values of sequential portions of the repetitive signal I; the outputs are recorded by means of suitable recorders 12 connected to receive the respective outputs by buffer amplifiers 13 of high input impedance. The outputs from the buffer amplifiers are smoothed by low pass filters 13a having a roll off frequency of about 20c/s. A monitor 14 is provided for monitoring the output of the signal averager 11, the monitor being connected to a monitoring terminal of the signal averager.

As previously mentioned, the signal averager 11 may be an instrument of the type sold by Princeton Applied Research Corporation as Model TDH-9 under the trade mark "Waveform Eductor." The signal averager 11 has an analogue memory providing 100 memory elements (the number of which can be changed if necessary, as required), and in accordance with trigger pulses T from the pulse generator 1 scans the repetitive input signal H so as to sample sequential portions of the signal and enter the values of such sequential portions in the respective memory locations formed by the elements. For the purpose of the present application the memory locations are strapped together in groups to provide six output channels, the outputs from which represent the time average values, and hence the noise-free values, of six sequential portions of the repetitive waveform. Alternatively, only certain elements may be selected and strapped together to provide a selected number of output channels.

In order to eliminate unwanted peaks from the signals H and I, arising from atmospherics, the output terminals of amplifiers 9 and 10 are each connected to earth by a suppresion circuit 16, 17, respectively, comprising a pair of reverse parallel connected diodes. The input terminal of the signal averager 11 is clamped to earth, except during the occurrence of the particular signals to be examined, via a P-type field effect transistor 18, the latter being triggered by a delayed trigger pulse J from the signal averager.

Each of the parallel gating circuits 7 and 8 comprises a normally non-conducting, series-connected, N-type field transistor 19, (or 19') and a normally conducting, shunt-connected, P-type field effect transistor 20 (or 20'). The gating circuits normally block the amplified secondary signals C, but are intermittently and alternately operable by trigger pulses D and E for gating secondary signals of the respective polarities.

The trigger pulses D and E are derived from respective AND gates 21 and 22. Each AND gate 21 and 22 gates the delayed trigger pulse J with a pulse L or M of appropriate polarity derived from the pulse generator 1.

It should be emphasized that the serial processing technique adopted by the present invention by the use of a signal averager eliminates the need for a long time constant integrating circuits. The signal averager eliminates noise from the signal and provides a response indicative of the true duration of the secondary transient signals and hence of the width of an ore body over which an aircraft in which the apparatus is mounted is flying.

The operation of the apparatus will now be further explained with reference to FIG. 2 in particular.

The primary electromagnetic field is generated by a sequence of current pulses P having the form of a half-sine wave and in the present example alternating polarity, although one might equally well use pulses of square or sawtooth form, the important thing being that the waveform exhibits abrupt discontinuities at appropriate intervals. For the purpose of this specification the term "abrupt discontinuity" means the commencement of an interval during which the amplitude of the waveform is constant. The current pulses are synchronized with the operating frequency of the pulse generator 1, which generates also square wave pulses L and M whose leading and trailing edges coincide with the beginning of each current pulse P. The pulse waveforms L and M are of alternating polarity and in antiphase. The waveform of the secondary signals received by the receiving coil 3, and of the signals A, B and C derived from it, is a differentiated half sine wave which, if the secondary signals are being reradiated from a conducting ore body, is accompanied by a decaying transient. The gating circuits 7 and 8 are blocking for the half cycle durations of the primary electromagnetic field, by reason of the fact that the field effect transistors 19 and 19' are non-conducting and the field effect transistors 20 and 20' are conducting. During the half cycles in which the primary electromagnetic field is not energized, however, the gating circuits 7 and 8 are triggered alternately by gating pulses D and E, the latter being produced by the gating of the delayed trigger pulses J with the pulse waveforms L and M of opposite, alternating polarity. Thus the gating circuits 7 and 8 gate only the transient responses, if any, these being denoted by the waveforms F and G. The effect of the differential amplifier 9 is to derive from the waveforms F and G a repetitive waveform H of one polarity representing a sequence of secondary transient components. The waveform H is amplified and applied to the input of the signal averager 11; the latter is normally inoperative to receive input signals as the field effect transistor 18 normally clamps the signal averager input terminal to ground, but during the quiescent periods between the primary field pulses the field effect transistor 18 is switched off by trigger pulses J from the signal averager.

Figure 3:
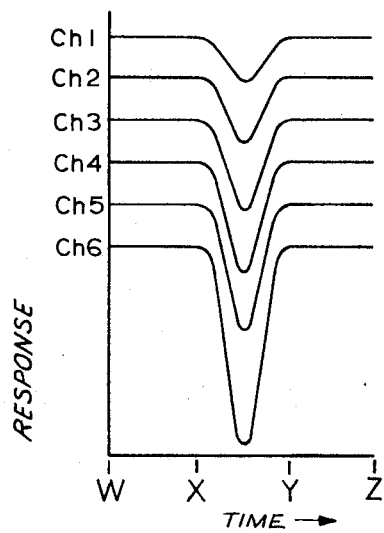
FIG. 3 shows types of record obtained by the apparatus of the invention.

The magnitude of the output of each channel of the signal averager is, of course, a time average value from which the random effect of noise is eliminated. FIG. 3 illustrates the typical response on the recorder obtained when a conducting ore body is detected by flying the apparatus over the ore body at a constant height. Each curve of Group 1 represents the value of the output from a respective one of the six channels as a function of time, the values being time average values of the sequential portions of the repetitive transient signal components, and so the curves of different peak amplitudes corresponding to different portions of a decay function. The regions WX and YZ of the figure represent periods in which no conducting bodies are detected, there being no transient secondary signals, while the region XY represents a period in which a conducting body is being detected; this corresponds, of course, to the width of the conducting body.

The system described above utilizes primary field pulses of alternating polarity; it will be appreciated that the system may be readily modified so as to utilize primary field pulses of the one polarity without departing from the scope and spirit of the invention.

However, the use of bipolar pulses has the advantage that any residual d.c. offsets existing in the baseline of the transients are averaged out, the reason for this being that the polarity is reversed for successive transients by the gating circuits 7 and 8. As a result of the action of the gating circuits 7 and 8 any residual d.c. offsets existing in the baseline of the transients produce a ripple on the outputs from the buffer amplifiers 13, the ripple frequency being half the pulse repetition rate, typically 144 c/s. This unwanted ripple is removed by the low pass filters 13a, the roll off frequency of which is considerably lower than the ripple frequency but high enough to pass wanted signal variations.

Figure 4:
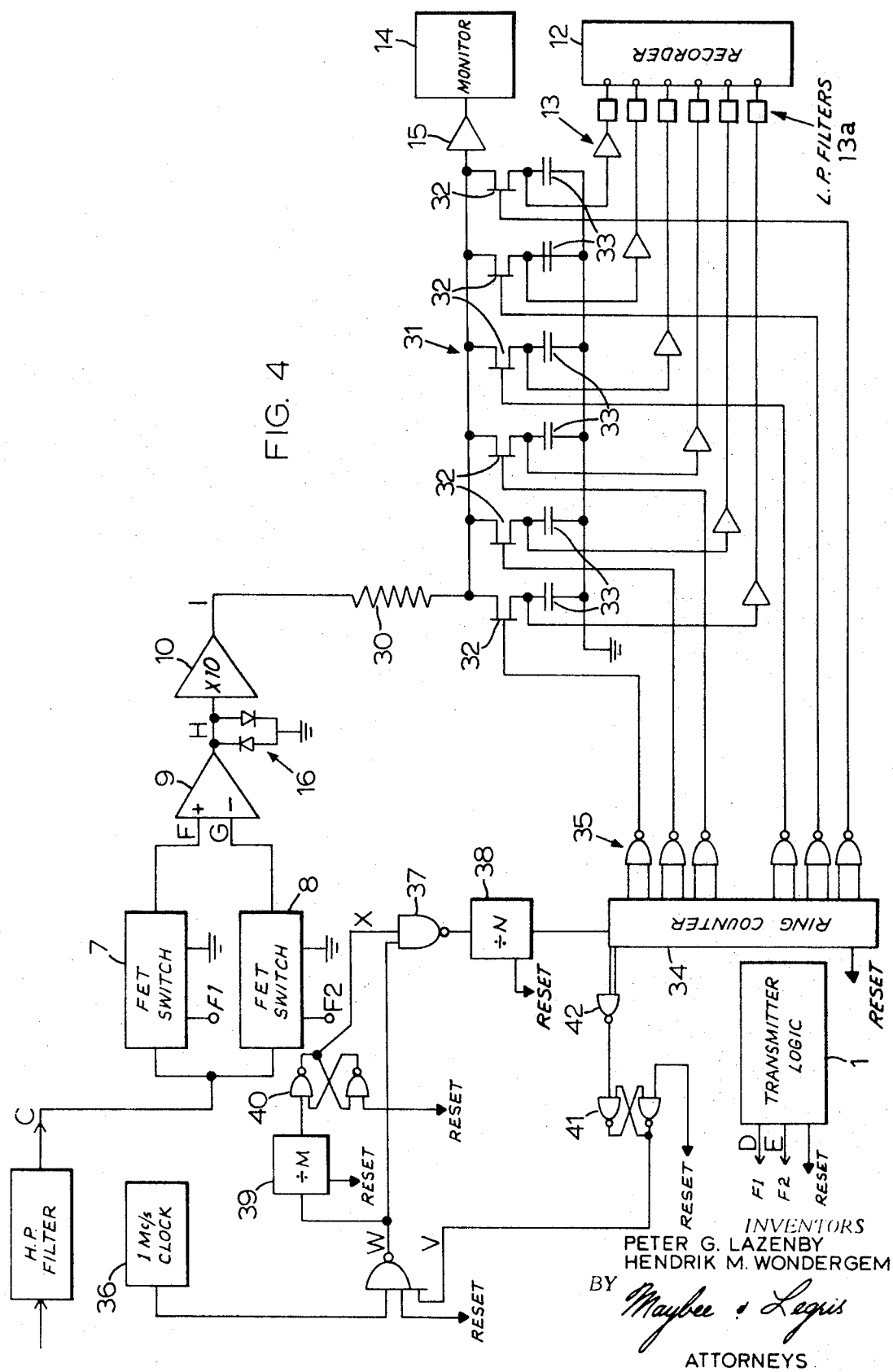
FIG. 4 is a block diagram of a modified receiving system of the invention.

FIG. 4 illustrates a modification of the receiving system described above. The system and its operation are substantially as described with reference to FIG. 1, except for the signal averager, and corresponding parts are denoted by the same reference numerals. The present description will be limited to the means for signal averaging.

The amplified signal I to be analyzed, which signal corresponds to the signal I of FIG. 2, is applied through a resistor 30 to the input of a memory unit 31. The memory unit 31 has six parallel-connected memory elements each consisting of a field effect transistor 32 and a capacitor 33, the connection between which is connected through a respective one of six buffer amplifiers 13 to an input terminal of a recorder 12. The field effect transistors 32 are gated sequentially by pulses occurring over selected periods of the recurrent cycle, so that the memory unit 31 is scanned to provide on each of its six output channels outputs which represent the average values of the selected portions of the repetitive waveform.

The scanning pulses are derived from an 8-stage Johnson ring counter 34, whose output terminals are selectively connected in pairs to the inputs of six NAND gates 35, the sequentially gated outputs being used to trigger the field effect transistors 32. The Johnson ring counter 34 is triggered in the following manner. Pulses from a 1 Mc/s clock oscillator 36 are gated with a reset signal from the transmitter logic 1 and with a hold-off signal V, the gated signal W being gated with a time delayed signal X by a NAND gate 37 and applied to a frequency divider 38, the output from which is used to trigger the ring counter 34. The time delayed signal X is derived by applying the signal W to a frequency divider 39, the output of which operates a toggle circuit 40 connected to one input terminal of the NAND gate 37. The hold-off signal V is derived from a toggle circuit 41 actuated by an end-of-sweep signal, the end-of-sweep signal being derived by gating the outputs of the appropriate two terminals of the Johnson ring counter by means of a NAND gate 42.

In operation of the system, after a predetermined delay following the occurrence of each reset pulse, the delay being determined by the circuit 39, 40 and 37, a train of trigger pulses is generated at a frequency determined by the clock oscillator 36 and the frequency divider 38. The pulses are fed to the input of the ring counter 34, from which are derived six sequential pulses by which the field effect transistors 32 are triggered, thus gating in sequence the contents of the six memory locations of the memory unit 31. A smoothed serial output is derived from the memory unit and applied to a monitor 14 through an amplifier 15.

What we claim as our invention is:

1. Apparatus for the remote detection of conducting bodies, comprising:
   a. a pulse generator for generating a sequence of pulses;
   b. transmitter means for radiating a primary electromagnetic waveform exhibiting abrupt discontinuities at times determined by said sequence of pulses;
   c. inductive receiving means for discerning secondary signals induced by said primary waveforms and reradiated by a conducting body together with any transient components of said secondary signals occurring after said abrupt discontinuities in the primary waveform;
   d. amplification means for amplifying the discerned signals;
   e. electronic gating means operable intermittently to sample said secondary transient components following said abrupt discontinuities in the primary waveform;
   f. means responsive to said sequence of pulses for intermittently operating said gating means for gating said secondary transient components whereby to derive a repetitive waveform characteristic of a sequence of said secondary transient components;
   g. further amplification means connected to said gating means for amplifying said repetitive waveform;
   h. a signal averager connected to receive the repetitive waveform, the signal averager providing a plurality of channels with outputs representing the average values of sequential portions of the repetitive waveform; and
   i. recording means connected to said channels for recording said outputs.

2. Apparatus according to claim 1, in which the signal averager has an analogue memory comprising a plurality of memory elements each consisting of a capacitor and a field effect transistor, and means for scanning the memory elements sequentially by sequentially and cyclically triggering the field effect transistors.

3. Apparatus for the remote detection of conducting bodies, comprising:
   a. a pulse generator for generating a sequence of pulses;
   b. transmitter means for radiating a primary electromagnetic waveform exhibiting abrupt discontinuities at times determined by said sequence of pulses;
   c. inductive receiving means for discerning secondary signals induced by said primary waveforms and reradiated by a conducting body together with any transient components of said secondary signals occurring after said abrupt discontinuities in the primary waveform;
   d. amplification means for amplifying the discerned signals;
   e. a differential amplifier having a pair of opposite polarity input terminals and an output terminal;
   f. electronic gating means operable intermittently to sample said secondary transient components following said abrupt discontinuities in the primary waveform, said gating means consisting of first and second gating circuits connected between said amplification means and a respective one of said opposite polarity input terminals;
   g. means responsive to said sequence of pulses for intermittently operating said first and second gating circuits alternately whereby each gating circuit gates secondary transient components of a respective polarity;
   h. said differential amplifier deriving a repetitive waveform of uniform polarity characteristic of a sequence of said secondary transient components;
   i. a signal averager connected to receive the repetitive waveform, the signal averager providing a plurality of channels with outputs representing the average values of sequential portions of the repetitive waveform; and
   j. recording means connected to said channels for recording said outputs.

4. Apparatus according to claim 3, including low pass filter means interposed between the signal averager and the recording means for filtering out ripple derived from the repetitive waveform.

5. Apparatus according to claim 4, wherein each of said gating circuits comprises a normally non-conducting, series-connected, N-type field effect transistor and a normally conducting, shunt-connected, P-type field effect transistor, each transistor having a gate connected to receive trigger pulses from said operating means for reversing the respective states of the transistors in accordance with the presence of such pulses.

* * * * *